United States Patent [19]

Russell

[11] 4,038,120
[45] July 26, 1977

[54] ELECTRIC HEAT BONDING TAPE METHOD FOR CONSTRUCTION PANELS

[76] Inventor: Carl D. Russell, 1502 S. Boulder St. No. 24-D, Tulsa, Okla. 74119

[21] Appl. No.: 305,147

[22] Filed: Nov. 9, 1972

[51] Int. Cl.² .............................................. E04B 2/00
[52] U.S. Cl. ...................................... 156/71; 156/272; 156/293
[58] Field of Search ................. 156/275, 109, 71, 293, 156/337, 272; 339/252; 285/297

[56] References Cited

U.S. PATENT DOCUMENTS

| | | | |
|---|---|---|---|
| 2,492,823 | 12/1949 | Young | 285/297 |
| 2,666,822 | 1/1954 | Pelletier et al. | 339/252 |
| 2,945,200 | 7/1960 | Tarbuck | 339/252 |
| 3,239,403 | 3/1966 | Williams et al. | 156/275 |
| 3,378,672 | 4/1968 | Blumenkranz | 156/275 |
| 3,654,005 | 4/1972 | Higgins et al. | 156/275 |
| 3,657,038 | 4/1972 | Lightfoot | 156/275 |
| 3,671,346 | 6/1972 | Tsuzuki | 156/275 |
| 3,733,231 | 5/1973 | Rutkowski et al. | 156/275 |
| 3,756,881 | 9/1973 | Denman | 156/293 |

Primary Examiner—William A. Powell
Assistant Examiner—Jerome W. Massie

[57] ABSTRACT

In building construction by the assembly of panels, a hot melt type glue embedding an electrical heater or element is employed. When current is applied, the heat from the heater melts the hot melt glue to a liquid state to become adhesive. Then the current is discontinued, allowing the glue to cool, and bond the panels. By leaving the electrical heater in the bond the heating unit may again be energized to permit the glue to be melted and the panel removed.

4 Claims, 7 Drawing Figures

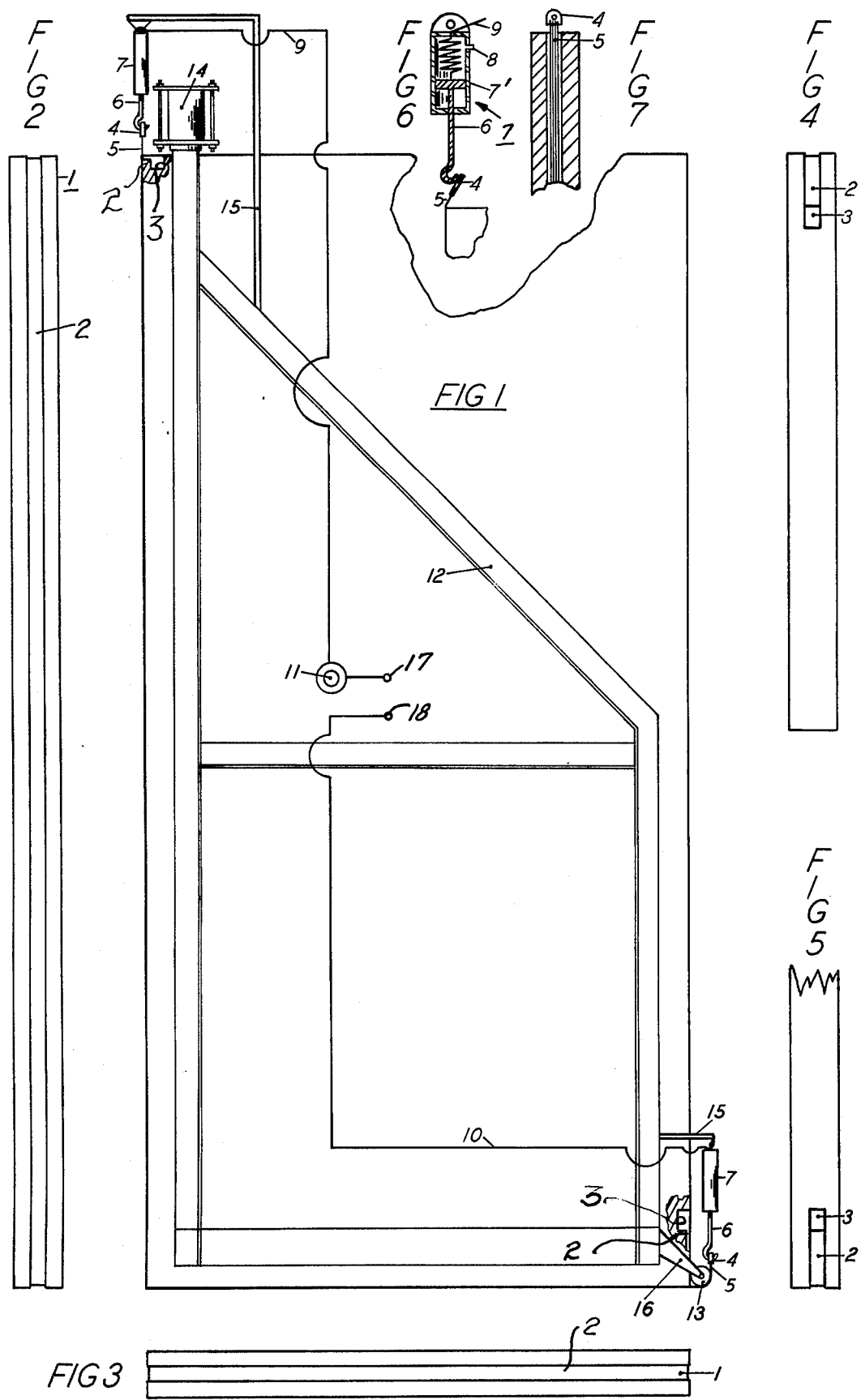

ELECTRIC HEAT BONDING TAPE METHOD FOR CONSTRUCTION PANELS

PRIOR ART

The only prior art known is gun applied heat melt glue which is applied when the panels are separated. But, when they are joined for bonding, there is no heat applied to the heat melt glue. Also, once the construction panels are bonded, there is no way to break the bond and separate the construction panels.

THE INVENTION

The invention comprises affixing hot melt type glue, in tape form, includng an electrical heating element, to the leading edges of a construction panel to be joined by bonding. Current is then applied to the heating element to melt the glue, the panel is assembled to one or more other panels, the current is removed, and the glue sets to bond the panels together.

A construction panel holding frame of a construction panel installer or machine supports tensioning means for the electrical heating element to maintain it in a predetermined location, as in a groove in edges of the panel, as expansion takes place due to heat. Also, disconnect means for the heater element, in the form of eyes at the ends of the element and hooks extending from the tensioning means cooperate to supply the current when melting temperatures are required, but permit separation from the panel installer after the heat has been developed. Recesses in other edges of the panel receive the eyes to maintain the eyes available for re-heating the melt to remove the panel. Also, a rheostat is provided in the supply circuit to adjust the heat producing temperature relative to different glue thickness, humidity, and the like.

OPERATION

When the construction panel 1 has been placed into position by the panel installer 12, and electrical connection made between eyes 4 and hooks 6 (at both sides of the heating element or wire 5), heating current, under control of the rheostat 11, needed to heat the hot melt glue (which covers wire 5 in groove 2) to a liquid cohesive state is supplied between terminals 17 and 18. Then, the electrical current is discontinued, allowing the hot melt glue to cool, thereby bonding the panel 1 to another panel, or the like. Then, the construction panel holder 12 of a panel installer machine (not shown) is disconnected and removed, leaving the heater element in the bonding glue. However, after the construction panel 1 has been installed and bonded, if it is desired to remove the construction panel, the construction panel installer 12 is again connected to the construction panel, and the tension type electrical connections are again made to the electrical heating element, and electrical current is supplied, causing the element to heat and re-melt the hot melt glue, releasing the bond, and allowing the construction panel installer to remove the construction panel 1.

The invention will be better understood from a reading of the following detailed description while viewing the drawings, wherein:

FIG. 1 is a front face or front view of a panel connected to panel holder 12 with cutaways showing groove 2 and connector eyelet recesses 3 for containing connector eyelets 4 when disconnected from hooks 6. Also, brackets 15, which hold tensioning electrical connectors 7 having the hooks 6 that engage eyelets 4 are secured to panel holder 12.

Bracket 16 secured to panel frame 12 carries roller or pulley 13 for the electrical heater wire or element 5. Input electrical wire 9 extends from input terminal 17 via rheostat 11 to upper tensioning electrical connector 7, and input electrical wire 10 extends from terminal 18 to lower tensioning connector 7 to provide a circuit for the flow of current through heater element 5.

FIG. 2 shows the left edge of a panel with groove 2 for the hot melt glue and the electrical heater 5.

FIG. 3 shows the bottom end of panel 1 with groove 2 for the hot melt glue and the electrical heater 5.

FIG. 4 shows the top edge of panel 1 with groove 2 and cavity 3 for containing heater 5 and eyelet 4 when upper hook 6 is disconnected.

FIG. 5 shows the right edge of panel 1 with groove 2 and cavity 3 for containing the end of heater 5 and lower eyelet 4 when they are disconnected.

FIG. 6 is a cutaway view of the tensioning electrical connector 7, heater wire 5, eyelet 4, hook 6, guide piston 7' and spring 19, air passage 8 and electrical wire 9, and, FIG. 7 shows a portion of the edge of panel 1 with heater 5 embedded in the panel and a portion of heater 5 extending to form eyelet 4.

In operation the tape-like glue and heater wire 5 are located in groove 2 with the wire ends being connected for energization. The panel is located in bonding position and then the wire 5 is energized to liquefy the glue. Energization is stopped and the glue hardens to bond. The panel holder 12 is removed and the terminal eyes 4 are snapped into the recesses 3.

If the panel is to be removed, the terminal eyes are taken out of the recesses 3 and power is re-applied to re-melt the glue.

What is claimed is:

1. The method of bonding a panel along at least one grooved predetermined edge thereof to existing structure comprising the steps of:
    locating an elongated hot melt glue tape including an elongated electrical heater means in said groove along said edge of the panel to be bonded;
    locating the panel with said edge in said bonding position relative to said structure;
    energizing the heater means to liquefy the glue;
    discontinuing the energization to permit the glue to cool and bond said edge to the structure; and,
    maintaining said elongated heater means under tension to take up expansion during said energization and while the glue cools.

2. The method of bonding panels along predetermined grooved edges thereof to existing structure comprising the steps of:
    locating a tape of elongated hot melt glue including embedded elongated electrical heater means in the grooves along said edges of the panel to be bonded;
    locating the panel with said edges in said bonding position relative to said structure;
    energizing the heater means to liquefy the glue, and, discontinuing the energization to permit the glue to cool and bond said edges to the structure.

3. The method of claim 6 comprising the further step of:
    tensioning the electrical heater means during the energization thereof and while the glue cools.

4. The method of claim 3 comprising the further step of:
    flexible using flexible grippable ends on the electrical heater means;
    to fit into recesses in edges of the panels which are not bonded for holding said grippable ends, respectively.

* * * * *